(12) United States Patent
Linscombe

(10) Patent No.: US 12,122,955 B2
(45) Date of Patent: Oct. 22, 2024

(54) INHIBITIVE DIVALENT WELLBORE FLUIDS, METHODS OF PROVIDING SAID FLUIDS, AND USES THEREOF

(71) Applicant: Schlumberger Technology Corporation, Sugar Land, TX (US)

(72) Inventor: Justin Linscombe, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/343,871

(22) Filed: Jun. 29, 2023

(65) Prior Publication Data

US 2023/0357622 A1 Nov. 9, 2023

Related U.S. Application Data

(62) Division of application No. 16/882,681, filed on May 25, 2020, now Pat. No. 11,746,275.

(60) Provisional application No. 62/852,310, filed on May 24, 2019.

(51) Int. Cl.
  *C09K 8/08* (2006.01)
  *C09K 8/05* (2006.01)

(52) U.S. Cl.
  CPC ................. *C09K 8/05* (2013.01); *C09K 8/08* (2013.01); *C09K 2208/12* (2013.01); *C09K 2208/34* (2013.01)

(58) Field of Classification Search
  CPC ........ C09K 8/05; C09K 8/08; C09K 2208/12; C09K 2208/34
  See application file for complete search history.

(56) References Cited

U.S. PATENT DOCUMENTS

| | | | |
|---|---|---|---|
| 2,156,333 A * | 5/1939 | Cross | E21B 21/065 210/299 |
| 4,900,457 A | 2/1990 | Clarke-Sturman | |
| 6,300,286 B1 | 10/2001 | Dobson, Jr. | |
| 6,391,830 B1 | 5/2002 | Dobson, Jr. | |
| 6,716,799 B1 | 4/2004 | Mueller | |
| 2003/0203822 A1 * | 10/2003 | Bradbury | C09K 8/502 507/200 |
| 2011/0172130 A1 | 7/2011 | Sarap | |
| 2017/0145296 A1 * | 5/2017 | Subhahani | C09K 8/514 |
| 2017/0199296 A1 | 7/2017 | Panamarathupalayam et al. | |
| 2017/0253785 A1 | 9/2017 | Galindo | |
| 2020/0369938 A1 | 11/2020 | Linscombe | |

OTHER PUBLICATIONS

Product data sheet (downloaed on Mar. 13, 2024).*

* cited by examiner

*Primary Examiner* — Kumar R Bhushan
(74) *Attorney, Agent, or Firm* — Jeffrey D. Frantz

(57) ABSTRACT

A wellbore fluid includes an aqueous fluid, a viscosifier, a stabilizer agent, and a lubricant. The aqueous fluid is an inhibitive divalent fluid. A method of preparing the divalent wellbore fluid is provided or formulated and includes methods of producing the divalent wellbore fluid, and methods of injecting or circulating the inhibitive divalent wellbore fluid into a wellbore or borehole provided in a formation and/or into a reservoir of the formation.

20 Claims, 10 Drawing Sheets

INHIBITIVE DIVALENT WELLBORE FLUIDS, METHODS OF PROVIDING SAID FLUIDS, AND USES THEREOF

CROSS REFERENCE TO RELATED APPLICATIONS

This application is a divisional application of U.S. patent application Ser. No. 16/882,681, filed May 25, 2020, which claims the benefit of, and priority to, U.S. Provisional Patent Application No. 62/852,310, filed on May 24, 2019. Each of the above applications is incorporated herein by reference in its entirety.

FIELD OF THE DISCLOSURE

The present disclosure is directed to inhibitive divalent wellbore fluids, methods of providing or producing the inhibitive divalent wellbore fluids and/or methods of using the inhibitive divalent wellbore fluids. In embodiments, the inhibitive divalent wellbore fluids may comprise at least one aqueous base fluid, one or more viscosifier agents or viscosifiers, one or more stabilizer agents or stabilizers and/or one or more lubricating agents or lubricants.

BRIEF DESCRIPTION OF THE DRAWINGS

The foregoing and other features of the present disclosure will become more fully apparent from the following description and appended claims, taken in conjunction with the accompanying drawings. Understanding that these drawings depict several embodiments in accordance with the disclosure and are, therefore, not to be considered limiting of its scope, the disclosure will be described with additional specificity and detail through use of the accompanying drawings.

DETAILED DESCRIPTION

Figure 1:
FIG. 1 is a digital photograph of a first core sample before experimental testing was conducted in accordance with embodiments disclosed herein.

In the following detailed description, reference is made to the accompanying drawings, which form a part hereof. The illustrative embodiments described in the detailed description, examples and drawings are not meant to be limiting and are for explanatory purposes. Other embodiments may be utilized, and other changes may be made, without departing from the spirit or scope of the subject matter presented herein. It will be readily understood that the aspects of the present disclosure, as generally described herein, set forth in the examples and/or illustrated in the drawings, may be arranged, substituted, combined, and designed in a wide variety of different configurations, each of which are explicitly contemplated and made part of this disclosure.

The present disclosure is generally drawn to inhibitive divalent wellbore fluids, methods of providing or producing the inhibitive divalent wellbore fluids and/or methods of using the inhibitive divalent wellbore fluids. Hereinafter, the inhibitive divalent wellbore fluids may be referred to as divalent wellbore fluids and/or may comprise at least one aqueous base fluid, one or more viscosifier agents or viscosifiers, one or more stabilizer agents or stabilizers and/or one or more lubricating agents or lubricants. In embodiments, the divalent wellbore fluids may be at least one high-density divalent wellbore fluid, at least one low-density divalent wellbore fluid and/or a combination thereof and the one or more stabilizer agents or stabilizers may be at least one thermal stabilizer agent or stabilizer. In embodiments, the methods may comprise injecting, pumping or circulating the divalent wellbore fluids into a wellbore, a borehole and/or a reservoir of a formation.

The divalent wellbore fluids disclosed herein (hereinafter "the present divalent wellbore fluid") may be a wellbore fluid, such as, for example, a drilling fluid, a cementing fluid, a completion fluid, a packing fluid, a work-over (repairing) fluid, a stimulation fluid, a well killing fluid, a spacer fluid, a drill-in fluid and/or a combination thereof. In embodiments, the present divalent wellbore fluid is configured or adapted for pumping, injecting or circulating into a wellbore or borehole of a well provided in a formation and/or a reservoir of the formation. In embodiments, the present divalent wellbore fluid is a drilling fluid, such as, for example a reservoir drill-in fluid (hereinafter "RDF") which may be configured or adapted for pumping, injecting or circulating into a reservoir or reservoir zone/area accessible via the wellbore or borehole of the well provided in the formation.

In embodiments, the present divalent wellbore fluid may comprise an aqueous fluid or solution. The aqueous fluid or solution may be a base fluid, such as, for example, a water-based fluid, a brine-based fluid or a combination thereof. The present divalent wellbore fluid may have an aqueous and/or brine fluid as the base liquid or the base fluid. In some embodiments, the present divalent wellbore fluid may have a brine base liquid or fluid. A majority of the present divalent wellbore fluid may comprise the aqueous fluid or solution. For example, the aqueous fluid may present in the present divalent wellbore fluid at a concentration ranging from at least about 50% to about 100%, from about 60% to about 99%, from about 70% to about 99% or from about 95% to about 99% by weight of the total divalent wellbore fluid.

In embodiments, the present divalent wellbore fluid, being formulated as a RDF, may have a divalent brine base liquid or fluid configured for pumping, injection or circulation into the reservoir or reservoir zone/area of the well. In other examples, the present divalent wellbore fluid may be a water-based drilling fluid that may utilize at least one divalent brine as the base fluid along with one or more viscosifier agents without or excluding biopolymers. Thus, the present divalent wellbore fluid may be, in embodiments, a divalent RDF that is a biopolymer-free brine base RDF for use in or with divalent brines and/or configured for improved or optimized reservoir production. In an embodiment, the present divalent wellbore fluid may be a water emulsion RDF configured or adapted for use as a completion fluid.

In embodiments, the aqueous fluid or solution of the present divalent wellbore fluid may include at least one of fresh water, sea water, brine, mixtures of water and water-soluble organic compounds and mixtures thereof. For example, the aqueous fluid or solution may be formulated with mixtures of desired salts in fresh water. Such salts may include, but are not limited to alkali metal chlorides, hydroxides, or carboxylates, for example. In various embodiments of the present divalent wellbore fluid, the brine may include seawater, aqueous fluids or solutions wherein the salt concentration is less than that of sea water, or aqueous solutions wherein the salt concentration is greater than that of sea water. Salts that may be found in seawater include, but are not limited to, sodium, calcium, sulfur, aluminum, magnesium, potassium, strontium, silicon, lithium, and phosphorus salts of chlorides, bromides, carbonates, iodides, chlorates, bromates, formates, nitrates, oxides, and fluorides. Salts that may be incorporated in a brine include any one or more of those present in natural seawater or any other organic or inorganic dissolved salts. Additionally, brines that may be used in the present divalent wellbore fluid may be natural or synthetic, with synthetic brines tending to be much simpler in constitution. In one embodiment, the density of the present divalent wellbore fluid may be controlled by increasing the salt concentration in the brine (up to saturation). As a result, the present divalent wellbore fluid may be a high-density or low-density wellbore fluid or RDF. In particular embodiments, a brine may include halide or carboxylate salts of mono- or divalent cations of metals, such as cesium, potassium, calcium, zinc, and/or sodium.

In several embodiments, the present divalent wellbore fluid may be a biopolymer-free low-density divalent RDF. Such biopolymer-free low-density divalent RDF may comprise a divalent brine base fluid and/or be utilized for or during fluid applications requiring low brine densities. In embodiments, the low brine densities may range from about 1.0 to about 1.5 $g/cm^3$, from about 1.1 to about 1.4 $g/cm^3$, or from about 1.13 to about 1.30 $g/cm^3$.

In other embodiments, the present divalent wellbore fluid may be a biopolymer-free High-density divalent RDF. Such biopolymer-free high-density divalent RDF may comprise a divalent brine base fluid and/or be utilized for or during fluid applications requiring high brine densities. In embodiments, the high brine densities may be up to about 3.0 $g/cm^3$, up to about 2.5 $g/cm^3$, or up to about 2.1 $g/cm^3$. In other embodiments, the high brine densities may range from about 10 lbm/galUS to about 20 lbm/galUS, from about 11 lbm/galUS to about 18 lbm/galUS, or from about 11.5 lbm/galUS to about 17.0 lbm/galUS. Moreover, the biopolymer-free high-density divalent RDF may exhibit thermal stability up to about 400° F., up to about 350° F., or up to about 300° F.

The present divalent wellbore fluid may provide a biopolymer-free fluid comprising divalent-brine base fluids which may further comprise bridging agents with a controlled particle-size distribution. As a result, the present divalent wellbore fluid may exhibit or achieve improved low equivalent circulating densities, improved low friction factors and improved compatibility with complex completions, such as, for example, openhole gravel packs.

In embodiments, the base fluid of the present divalent wellbore fluid may be brine produced from a well or field formed in a formation (hereinafter "produced brine base fluid"). The produced brine base fluid of the present divalent wellbore may comprise at least one of the following ions selected from the group consisting of a bromide ion, a calcium ion, a sodium ion, a magnesium ion, a potassium ion, an iron ion, a chloride ion, a nitrate ion and a sulfate ion. Moreover, the produced brine base fluid may comprise one or more metals or heavy metals selected from the group consisting of As, Cd, Cr, Cu, Mn, Mo, Ni, Pb, Se, V and Zn. The present disclosure should not be deemed as limited to a specific embodiment of the ion and/or the heavy metal that may be present in the produced brine base fluid.

The present divalent wellbore fluid may comprise at least one water or brine base fluid (hereinafter "the base fluid"), at least one primary viscosifier agent or viscosifier (hereinafter "the at least one primary viscosifier"), at least one secondary viscosifier agent or viscosifier (hereinafter "the at least one secondary viscosifier"), at least one temperature stabilizing agent or temperature stabilizer (hereinafter "the at least one stabilizer") and/or at least one lubricating agent or lubricant (hereinafter "the at least one lubricant").

The base fluid of present divalent wellbore fluid may be a water base fluid or a brine base fluid, such as, for example, a divalent brine base fluid or a divalent brine fluid loss control pill. In embodiments, the density of the base fluid may be from about 9.5 to about 10 lbm/gal, from about 9.6 to about 9.9 lbm/gal, or from about 9.7 to about 9.8 lbm/gal. A majority of the present divalent wellbore fluid may comprise the base fluid. In other words, the base fluid may be present in the present divalent wellbore fluid at a concentration of at least about 50%, at least about 75%, at least about 90%, at least about 95%, at least about 97% or at least about 99% by weight of the total divalent wellbore fluid. In other embodiments, the base fluid may be present in the present divalent wellbore fluid at a concentration ranging from at least 0.95 bbl, at least 0.97 bbl or at least 0.99 bbl.

Exemplary primary and secondary viscosifier agents or viscosifiers may include those disclosed in U.S. Pat. Nos. 6,300,286 and 6,391,830 which are hereby incorporated by reference, in their entirety.

The at least one primary viscosifier may be at least one starch derivative. In embodiments, the at least one starch derivative may be, for example, a high-molecular-weight, branched-chain starch derivative. The at least one starch derivative may have a specific gravity of at least about 1.4, no more than 1.6, or about 1.5 and/or may be at least partially soluble in water or brine. In embodiments, the at least one starch derivative may be utilized in calcium chloride, calcium bromide, zinc bromide and divalent field brines, and the at least one primary viscosifier may control filtrate loss in the present divalent wellbore fluid and/or be utilized as a fluid loss additive. In embodiments, the water/brine solubility of the at least one starch derivative may be at least about 90%, at least about 95%, or about 100%.

In embodiments, the at least one primary viscosifier may be present in the present divalent wellbore fluid at a concentration ranging from about 20 to about 40 kg/m$^3$, from about 21 to about 35 kg/m$^3$, or from about 22.8 to about 34.2 kg/m$^3$. In other embodiments, the at least one primary viscosifier may be present in the present divalent wellbore fluid at a concentration ranging from about 5 to about 15 ppb, from about 6 to about 12 ppb, from about 7 to about 10 ppb, or from about 8 to about 9 ppb.

The at least one secondary viscosifier may be at least one magnesium compound. In embodiments, the at least one magnesium compound may be, for example, a fine-particle-size, highly reactive magnesium compound having a specific gravity from at least about 3.40, at least about 3.5, no more than about 3.7, no more than about 3.6, or about 3.56. In embodiments, the at least one secondary viscosifier may have a slight water solubility of less than about 5%, less than about 2%, or less than about 1%. In embodiments, the at least one secondary viscosifier may be utilized as and/or may be a pH control agent and/or may synergistically interact with the at least one primary viscosifier to enhance low-shear-rate viscosities of the biopolymer-free low-density divalent RDF and/or biopolymer-free high-density divalent RDF.

The at least one secondary viscosifier may be present in the present divalent wellbore fluid at a concentration range from about 0.5 to about 7 kg/m$^3$, from about 0.6 to about 6.5 kg/m$^3$, or from about 0.7 to about 6.4 kg/m$^3$. The at least one secondary viscosifier may be present in the present divalent wellbore fluid at a concentration range from about 0.5 to about 5 ppb, from about 0.75 to about 4 ppb, from about 1 to about 3 ppb, or from about 1.5 to about 2 ppb.

In embodiments, the at least one primary viscosifier and the at least one secondary viscosifier may interact in a surprising and unexpected synergistic manner to enhance, elevate and/or improve low shear-rate viscosity of the present divalent wellbore fluid.

The at least one lubricant may be soluble in the base fluid of the present divalent wellbore fluid. In embodiments, the at least one lubricant is a water-soluble brine lubricant. The at least one lubricant may be a wellbore fluid or mud lubricant that may reduce torque, drag and friction in wellbore fluids or RDFs. The at least one lubricant may be present in the present divalent wellbore fluid at a concentration ranging to no more than 5%, from about 0.6 to about 4%, from about 0.6 to about 3.5%, or from about 2 to about 3% by weight of the total divalent wellbore fluid. For example, the lubricant can comprise an alkyl or aryl that may be in the form of an ester or ether. The lubricant may comprise an alcohol, such as glycol or isopropyl alcohol. In an embodiment, the lubricant may be an ester in a base fluid with isopropyl alcohol or a polyglycol.

The at least one stabilizer may be a blend of polymeric alkaline materials and/or may buffer the pH of the present divalent wellbore fluid in a pH region of from about 9 to about 12 or from about 10 to about 11. As a result, the present divalent wellbore fluid may reduce and/or minimize hydrolysis and/or reduce breakdown rates of polysaccharides and cellulosics by preventing chemical reactions creating thermal degradation of the polymers. In embodiments, the blend of polymeric alkaline materials may have a specific gravity from about 1.0 to about 1.02, a flash point of at least about 200° F. or at least about 205° F., and a boiling point of at least about 330° F. or about 340° F.

The at least one stabilizer may be present in the present divalent wellbore fluid at a concentration range of no greater than 0 ppb, from about 1 to above 5 ppb, from about 1.5 to about 4.5 ppb, or from about 2 to about 4 ppb. For example, the at least one stabilizer may be obtained from the product PTS-200 sold by M-I SWACO.

The present divalent wellbore fluid may exhibit and/or achieve one or more fluid properties or mud properties. In embodiments, the one or more fluid or mud properties may comprise one or more values and/or value ranges associated with the Bingham-plastic model, such as, for example, plastic viscosity (hereinafter "PV") values and/or yield point (hereinafter "YP") values.

In embodiments, the PV value exhibited or achievable by the present divalent wellbore fluid may range from at least about 2.5 to no more than about 30, from about 4 to about 25, from about 5 to about 22, from about 7 to about 21 or from about 8 to about 16. In other embodiments, the PV value exhibited or achievable by the present divalent wellbore fluid may range from at least about 2.75 to no more than about 10.5, from about 4.5 to about 7.5, from about 5.0 to about 7 or from about 5.5 to about 7.

In embodiments, the YP value exhibited or achievable by the present divalent wellbore fluid may range from at least about 2.5 to no more than about 50, from about 5 to about 40, from about 10 to about 30, from about 12 to about 26 or from about 19 to about 25. In other embodiments, the YP value exhibited or achievable by the present divalent wellbore fluid may range from at least about 1.5 to no more than about 35, from about 3 to about 25, from about 4 to about 12, from about 5 to about 10 or from about 7 to about 10.

The one or more fluid or mud properties may also comprise coefficient of friction, µ, values or value ranges exhibited or achievable by the present divalent wellbore fluid. The coefficient of friction, u, values may be measured at 60 rpm and 150 psi. In embodiments, the coefficient of friction, u, exhibited or achievable by the present divalent wellbore fluid may range from about at least 0.01 to no more than 0.20, from about 0.03 to about 0.15, from about 0.05 to about 0.14 or from about 0.11 to about 0.14.

One or more conventional methods may be used to prepare the present divalent wellbore fluid in a manner analogous to those normally used, to prepare conventional aqueous- or water-based wellbore fluids. In one embodiment, a desired quantity of aqueous base fluid and a suitable amount of one or more of the at least one primary viscosifier, the at least one secondary viscosifier, the at least one stabilizer and/or the at least one lubricant, as described above, are mixed together with continuous mixing. In an embodiment, an emulsion divalent wellbore fluid may be formed by vigorously agitating, mixing, or shearing the present divalent wellbore fluid in the presence of one or more emulsifying agents and/or additives or emulsifiers.

In yet another embodiment, the present divalent wellbore fluid may be used alone or in combination with one or more conventional or additional additives. The additional additives, that may be included in the present divalent wellbore fluid, include, for example, wetting agents, organophilic clays, viscosifiers, fluid loss control agents, surfactants, dispersants, interfacial tension reducers, pH buffers, mutual solvents, thinners, thinning agents, and cleaning agents. The addition of such additives should be well known to one of ordinary skill in the art of formulating wellbore fluids and muds or RDFs.

In embodiments, the methods disclosed herein may comprise preparing the present divalent wellbore fluid by mixing or formulating at least one aqueous base fluid, the at least one primary viscosifier, the at least one secondary viscosifier, the at least one stabilizer and/or the at least one lubricant, as described above. After mixing or formulating the present divalent wellbore fluid, the method may further comprise pumping, injecting or circulating the present divalent wellbore fluid into a wellbore or borehole of well formed in a formation and/or into a reservoir area/zone of the formation. In embodiments, the method may further comprise retrieving the present divalent wellbore fluid from the wellbore, borehole and/or reservoir area/zone of the formation. Moreover, the retrieved divalent wellbore fluid may be filtered, recycled and/or treated for subsequent use as a wellbore fluid or RDF.

In embodiments, the methods disclosed herein may comprise preparing the present divalent wellbore fluid by mixing or formulating at least one cloud point polyglycol based shale stabilizer. Clouding polyglycols when used in conjunction with inhibitive salts such as, calcium chloride or potassium chloride, can be used in water based systems to control water sensitive shales by minimizing the amount of water invasion into pre-existing fractures. The clouding polyglycol chemistry is selected based on the expected downhole temperature and base fluid salinity to ensure adequate clouding properties for maximum shale stabilization. When the fluid environment is above the cloud point, the polyglycol becomes insoluble in water and penetrates the shale which plugs micropores and minimizes the amount water uptake from the shale. Additional glycol based stabilizers in which glycol is the carrier fluid for a predispersed gilsonite suspension for additional shale stability.

Examples

The present disclosure and proposals are further illustrated by the following specific examples, and these examples are provided to illustrate the disclosure and proposals, and do not unnecessarily limit them.

1. Produced Brine Base Fluid Composition for the Divalent Wellbore Fluid

A suitable produced brine base fluid for the present divalent wellbore fluid was produced from a well or field (hereinafter "produced brine" or "field brine"). The produced brine base fluid was analyzed via Ion Analysis-IC, chloride/bromide titration and ICP analysis to determine the salt and metal compositions therein. The determined salt and metal compositions are set forth in Tables 1 and 2 respectively.

TABLE 1

Regular salt analysis results:

| | Produced brine for present divalent wellbore fluid |
|---|---|
| Bromide | 0.30 w % |
| Calcium | 0.88 w % |
| Sodium | 7.38 w % |
| Magnesium | 630 mg/Kg |
| Potassium | 0.74 w % |
| Iron | 0.1 mg/Kg |
| Chloride | 13.26 w % |
| Nitrate | <1 mg/Kg |
| Sulfate | <1 mg/Kg |

TABLE 2

Heavy metal results:

| | Produced brine for present divalent wellbore fluid |
|---|---|
| As (mg/Kg) | <0.01 |
| Cd (mg/Kg) | <0.01 |
| Cr (mg/Kg) | <0.01 |
| Cu (mg/Kg) | 0.1 |
| Mn (mg/Kg) | 7.1 |
| Mo (mg/Kg) | 0.2 |
| Ni (mg/Kg) | 0.1 |
| Pb (mg/Kg) | <0.01 |
| Se (mg/Kg) | <0.01 |
| V (mg/Kg) | 0.02 |
| Zn (mg/Kg) | 0.3 |

2. Long-Term Immersion Stability Test on Formation Core Sections

Long-term immersion stability testing was conducted on core sections of a shale formation to provide and/or produce stability testing results. Those stability testing results were analyzed to identify and/or determine suitability of the present divalent wellbore fluid to be utilized as RDFs in shale formations. Analysis of the stability testing results and shale formation included: mineralogy and reactivity values via x-ray diffraction (hereinafter "XRD") and cation exchange capacity (hereinafter "CEC"); core descriptions; and petrographic analysis of core sections. Based on the rock properties and core section quality, long-exposure immersion testing was carried out for shale stability testing.

The core sections tested comprised a Core Slab 1 and Core Slab 2 (collectively referred to hereinafter as "Core Slabs 1 and 2"). Core Slab 1 was collected or taken from a formation depth of about 10,572.7 to about 10,573.0 feet deep, and Core Slab 2 was collected or taken from a formation depth of about 10,584.4 to about 10,585.0 feet deep. The Core Slabs 1 and 2 had the following characteristics.

Figure 2:
FIG. 2 is a digital photograph of a second core sample before experimental testing was conducted in accordance with embodiments disclosed herein.

First, the Core Slabs 1 and 2 were a dark black, organic-rich shale, and the Core Slabs 1 and 2 were very hard, well-compacted, and well-laminated (see FIGS. 1 and 2). The Core Slabs 1 and 2 each arrived in 2-3 sections, broken parallel to the bedding plane direction. Pre-existing fractures are present and mainly parallel to the bedding plane direction and laminations. The Core Slabs 1 and 2 contained about 7-12% clay minerals. Illite was the dominate clay mineral present in Core Slab 2, while Illite and Smectite were approximately equal in proportion in Core Slab 1. A majority of the mineral composition came from Quartz. The Core Slabs 1 and 2 contained about 2-3% Pyrite in the pieces submitted for x-ray diffraction, but Pyrite-rich layers are visible within the section and may contain significantly higher amounts. The organic content of the Core Slabs 1 and 2 was about 7-13%. Pieces that were submitted for XRD and CEC were representative of an "average" mineralogy of the analyzed samples, but the Core Slabs 1 and 2 may have contained layers with higher amounts of certain minerals (clay minerals, quartz, pyrite, etc.).

Based on the analyzed characteristics of the Core Slabs 1 and 2, long-term immersion testing was performed on the Core Slabs 1 and 2 with three different testing fluids. The three testing fluids were fresh water (hereinafter "the reference fluid"), produced/formation water or brine (hereinafter "produced/formation water") and the present divalent wellbore fluid comprising the produced/formation water.

A. Mineralogy (XRD) and Cation Exchange Capacity (CEC)

Results of Semi-Quantitative XRD and Methylene Blue Test of the Core Slabs 1 and 2 are set forth below in Table 3.

TABLE 3

| Mineralogy Data (% wt): | | |
| --- | --- | --- |
| | 10572.7-10573.0 | 10584.4-10585.0 |
| Smectite* | 3 | 1 |
| Illite | 4 | 11 |
| Calcite | 1 | 9 |
| Quartz | 75 | 43 |
| Dolomite | 2 | 9 |
| Feldspars | 5 | 12 |
| Pyrite | 3 | 2 |
| Organics** | 7 | 13 |
| CEC, meq/100 gr | 3 | 1 |

*Include illite/mixed layers.
**Organics determined by TGA

The results of the XRD analysis indicated that the sample is primarily composed of Quartz (~43-75%). Illite is the predominate clay mineral in Core Slab 2, but Smectite is also present. In Core Slab 1, the clay minerals are present in approximately equal proportions. The higher amount of Illite compared to the low amount of Smectite indicates that the sample may have undergone stronger diagenesis and thermal alteration; this is consistent with other core features. The sample contains a high amount of Pyrite, which may suggest that the shale could be deposited in a strong anoxic environment. Organics constitute about 7-13% of the sample composition. Based on the CEC results, the sample has low potential for chemical reactivity, such as, for example, a low reactive shale: CEC<10 meq/100 gr.

B. Thin Sections

Thin section observations were conducted to collect and/or produce information to determine and/or understand the mineralogy, texture, structure, and fracturing of the rock samples of the Core Slabs 1 and 2. This information established a base to evaluate the potential effects of three test fluids on the stability of the formation.

Figure 3:
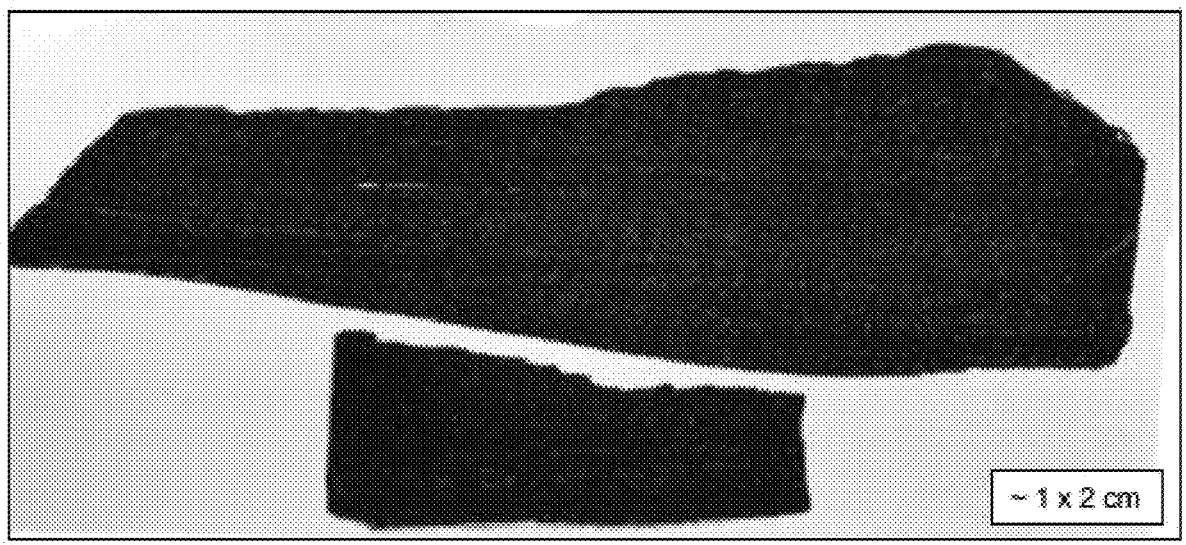
FIGS. 3-5 are digital photographs of a thin section cut from the first core sample in accordance with embodiments disclosed herein.

The sample of Core Slab 1 was set in blue dyed epoxy before cutting into the thin section. FIG. 3 shows the thin section cut from Core Slab 1.

Figure 4:
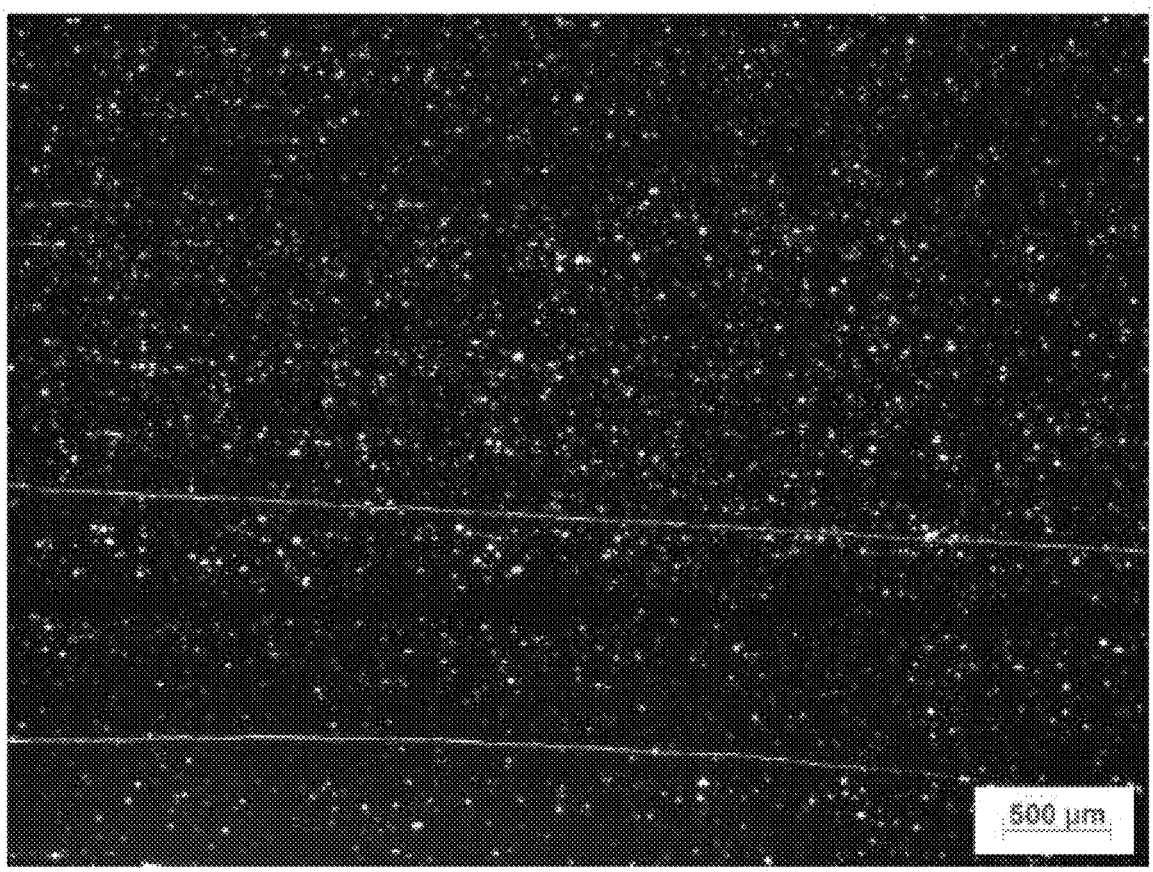

FIG. 4 shows that the thin section sample of Core Slab 1 was very dark in color. The dark color was attributed to the high amount of pyrite and organic material. Bright white spots were mostly quartz grains. Dark material was clay minerals, pyrite, and insoluble organics. Two thin fractures (blue) were visible parallel to the bedding plane and laminations. The sample of Core Slab 1 was well-laminated and well-compacted.

Figure 5:
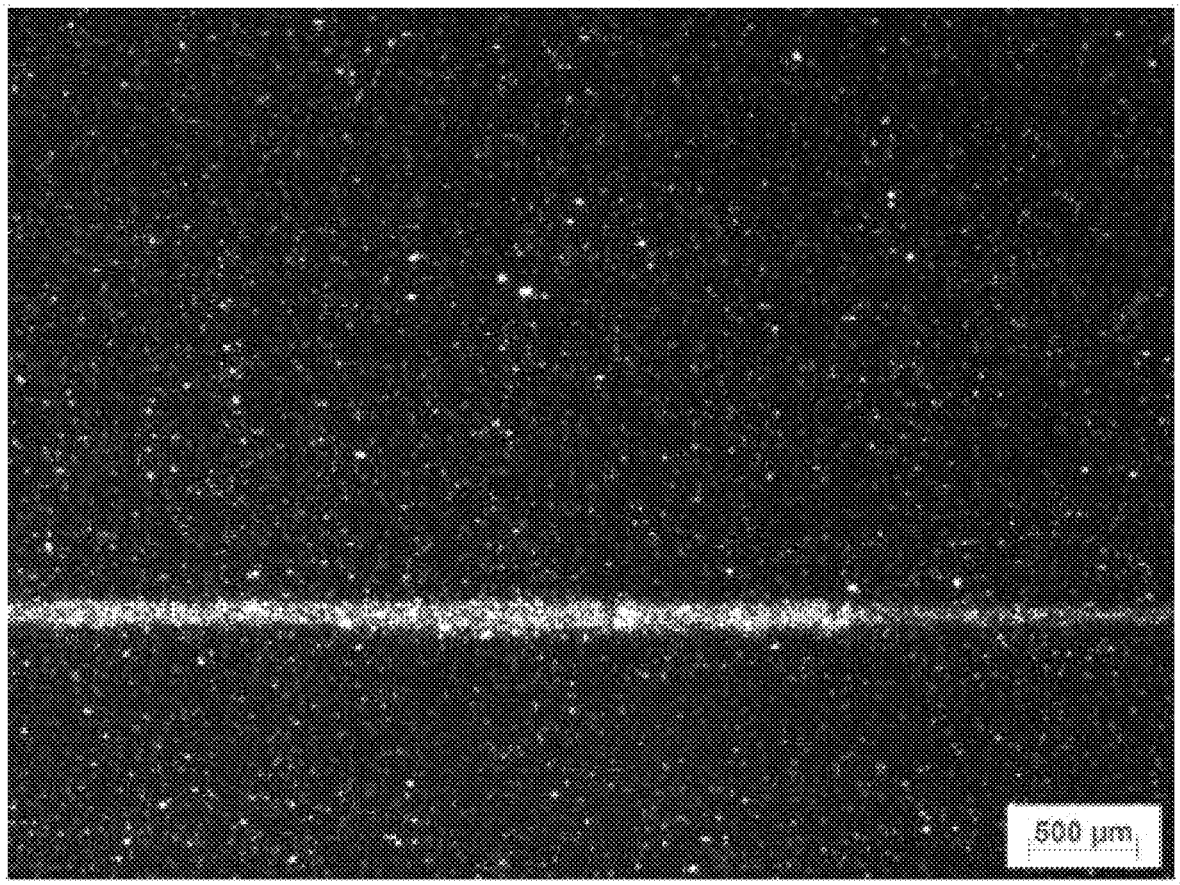

FIG. 5 shows the same thin section view of Core Slab 1 as shown in FIG. 4, but with reflective light instead of polarized light. The reflected light allowed for pyrite to be seen. In the polarized light view (see FIG. 4), pyrite was dark black. In the reflected light, pyrite was bright white (as visible in FIG. 5).

Figure 6:
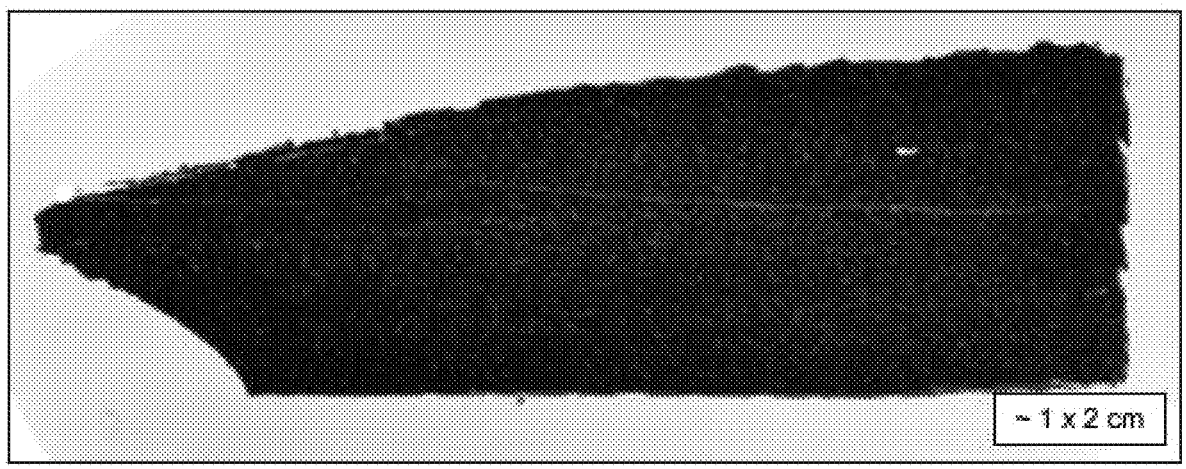
FIGS. 6-8 are digital photographs of a thin section cut from the second core sample in accordance with embodiments disclosed herein.

The sample of Core Slab 2 was set in blue dyed epoxy before cutting into the thin section. FIG. 6 shows the thin section cut from Core Slab 2.

Figure 7:
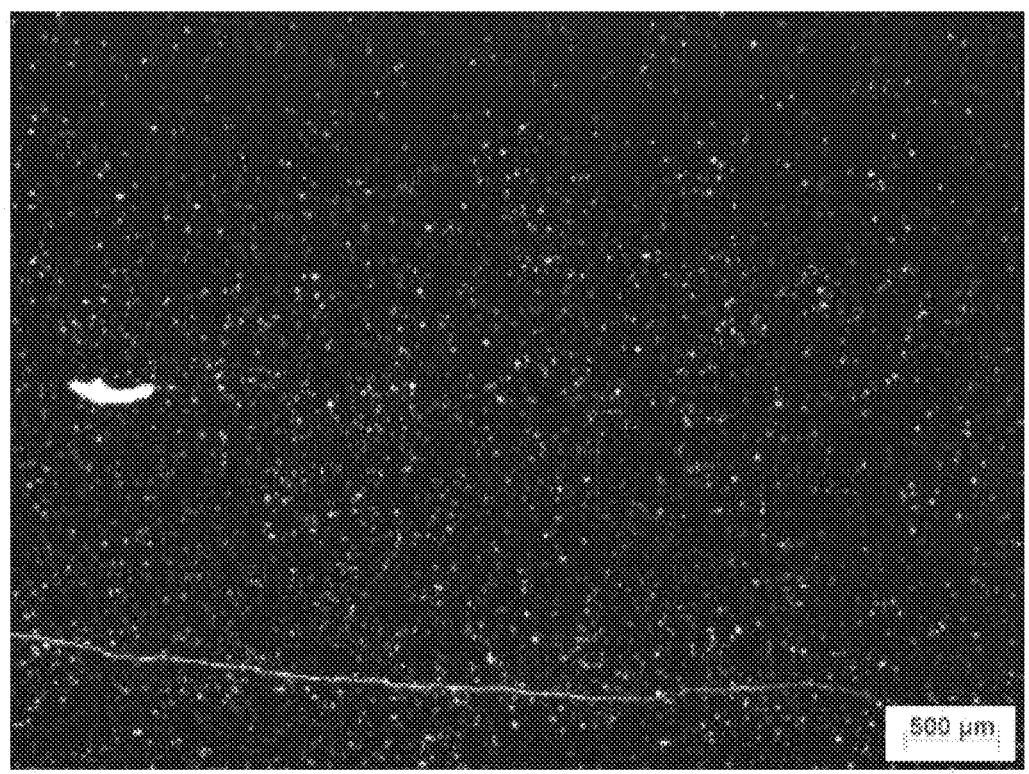

FIG. 7 shows that the thin section sample of Core Slab 2 was very dark in color. The dark color was attributed to the high amount of pyrite and organic material. Bright white spots were mostly quartz grains. Dark material was clay minerals, pyrite, and insoluble organics. One thin fracture (blue) were visible parallel to the bedding plane and laminations. The sample was well-laminated and well-compacted.

Figure 8:
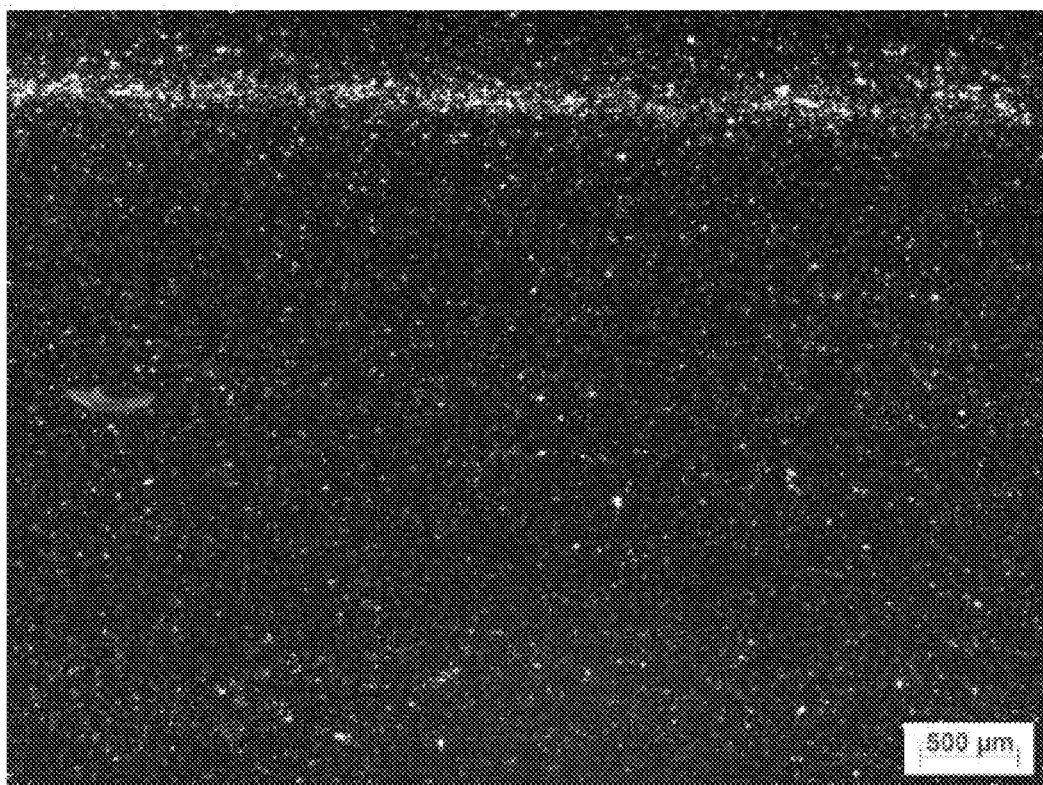

FIG. 8 shows the same thin section view of Core Slab 2 as shown in FIG. 7, but with reflective light instead of polarized light. The reflected light allowed for pyrite to be seen. In the polarized light view (see FIG. 7), pyrite was dark black. In the reflected light, pyrite was bright white (as shown in FIG. 8).

Figure 9:
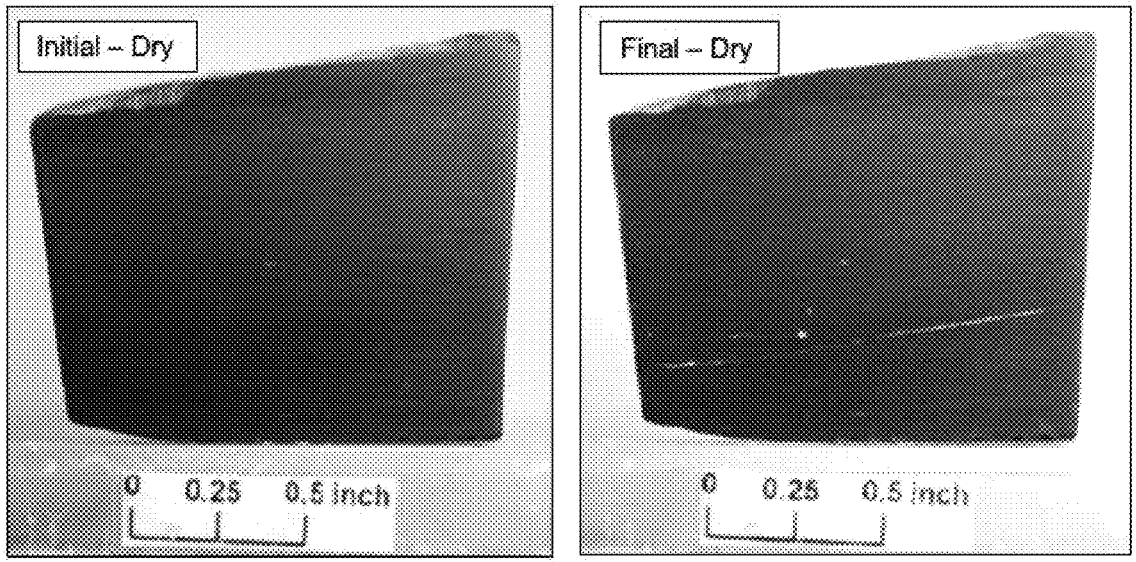
FIG. 9 is digital photographs of the thin section cut of the first core sample initially dry in the left-side photograph and finally dry after long-term exposure to freshwater in the right-side photograph in accordance with embodiments disclosed herein.

C. Stability Testing Procedures i. Immersion Test Steps:
   cutting the rock sample into comparable pieces, approximately equal in size. A diamond blade for dry cutting application is used to avoid any contact of the rock with fluid before testing;
   selecting the front side of the sample and remove the mark of the blade using sand paper;
   photographing the samples before exposure to the fluids (Initial-Dry);
   immersing the samples in the fluids in containers for 2 weeks at room temperature;
   taking photographs of the samples during the fluid exposure (for clear fluids);
   removing the samples from the containers and let the sample dry at room temperature; and
   taking a final photograph.

ii. Fluids Tested:
   freshwater;
   produced/formation water; and
   present divalent wellbore fluid comprising produced/formation water.

iii. Test Data/Information Collected:
   FIG. 9 shows, prior to fluid exposure to the freshwater, some pre-existing fracture planes were visible approximately parallel to the bedding laminations. After two (2) weeks of fluid exposure to the fresh water, pre-existing fractures were not enlarged or propagated. Development of new fractures was not evident. Minor precipitation was formed along pre-existing fracture surfaces after samples were removed from the fluids and allowed to dry at room temperature.

Figure 10:
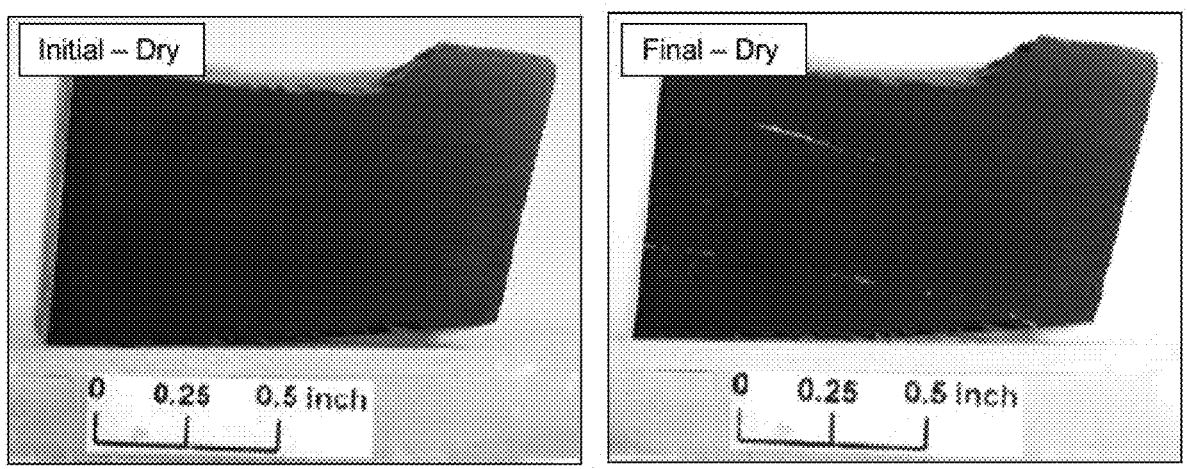
FIG. 10 is digital photographs of the thin section cut of the second core sample initially dry in the left-side photograph and finally dry after long-term exposure to freshwater in the right-side photograph in accordance with embodiments disclosed herein.

FIG. 10 shows, prior to fluid exposure to the freshwater, some pre-existing fracture planes were visible approximately parallel to the bedding laminations. After two (2) weeks of fluid exposure to the freshwater, pre-existing fractures were not enlarged or propagated. Development of new fractures was not evident. Minor precipitation was formed along pre-existing fracture surfaces after samples were removed from the fluids and allowed to dry at room temperature.

Figure 11:
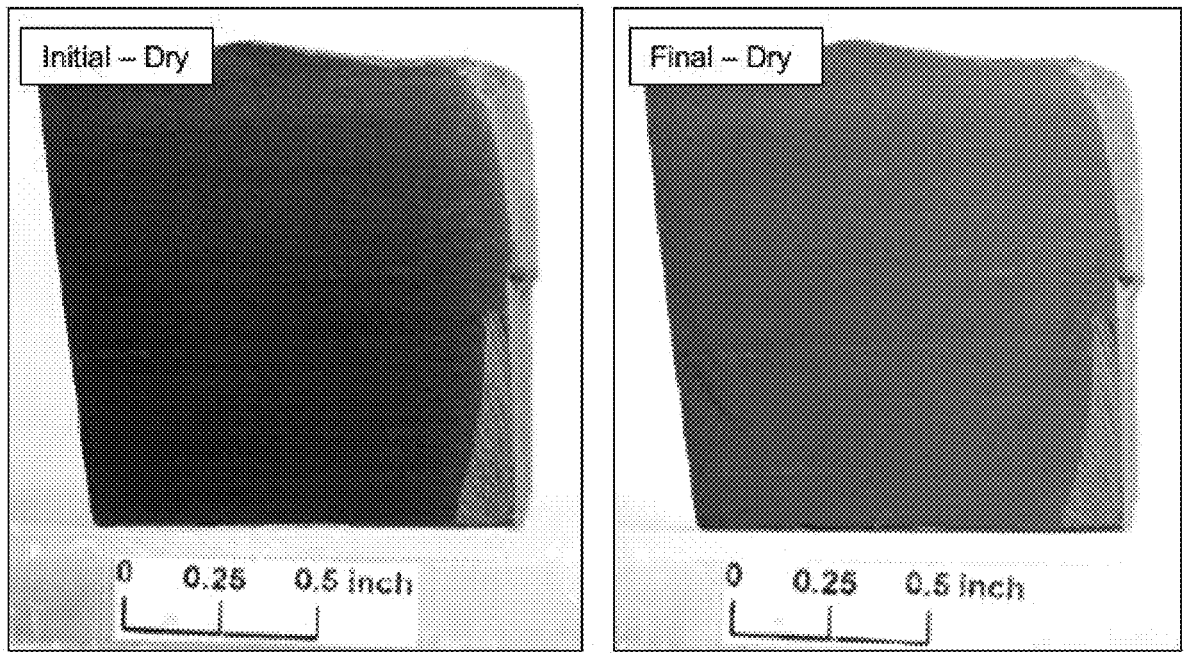
FIG. 11 is digital photographs of the thin section cut of the first core sample initially dry in the left-side photograph and finally dry after long-term exposure to the produced/formation water in the right-side photograph in accordance with embodiments disclosed herein.

FIG. 11 shows, prior to fluid exposure to the produced/formation water, some pre-existing fracture planes were visible approximately parallel to the bedding laminations. After two (2) weeks of fluid exposure to the produced/formation water, pre-existing fractures were not enlarged or propagated. Development of new fractures was not evident.

Figure 12:
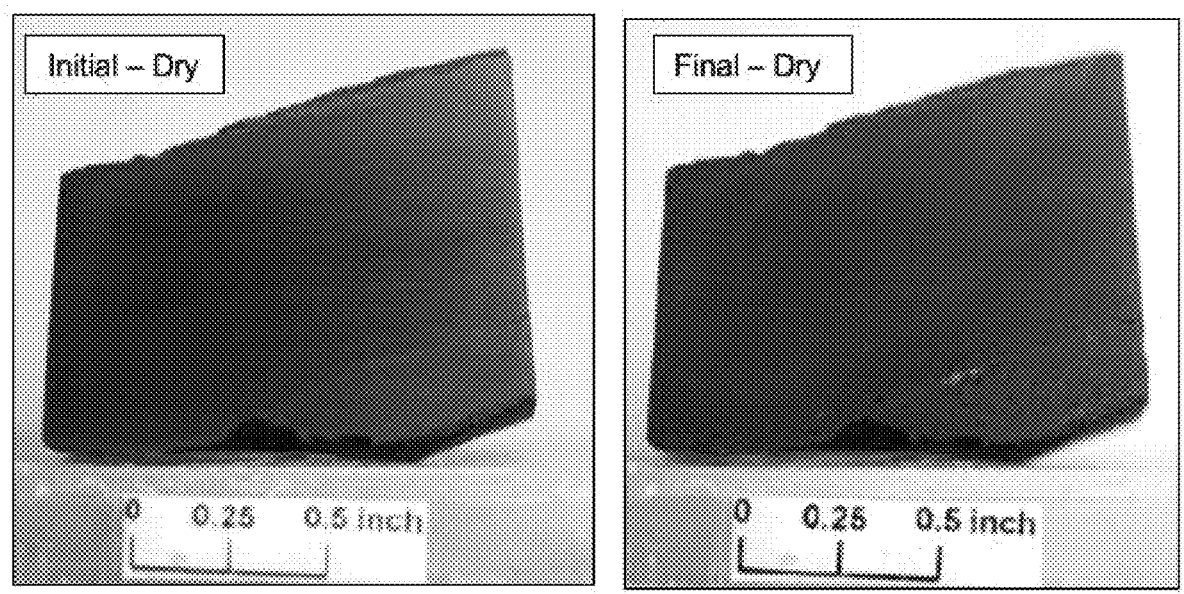
FIG. 12 is digital photographs of the thin section cut of the second core sample initially dry in the left-side photograph and finally dry after long-term exposure to the produced/ formation water in the right-side photograph in accordance with embodiments disclosed herein.

FIG. 12 shows, prior to fluid exposure to the produced/formation water, some pre-existing fracture planes were visible approximately parallel to the bedding laminations. After two (2) weeks of fluid exposure to the produced/ formation water, pre-existing fractures were not enlarged or propagated. Development of new fractures was not evident. Minor precipitation was formed along pre-existing fracture surfaces after samples were removed from the fluids and allowed to dry at room temperature.

Figure 13:
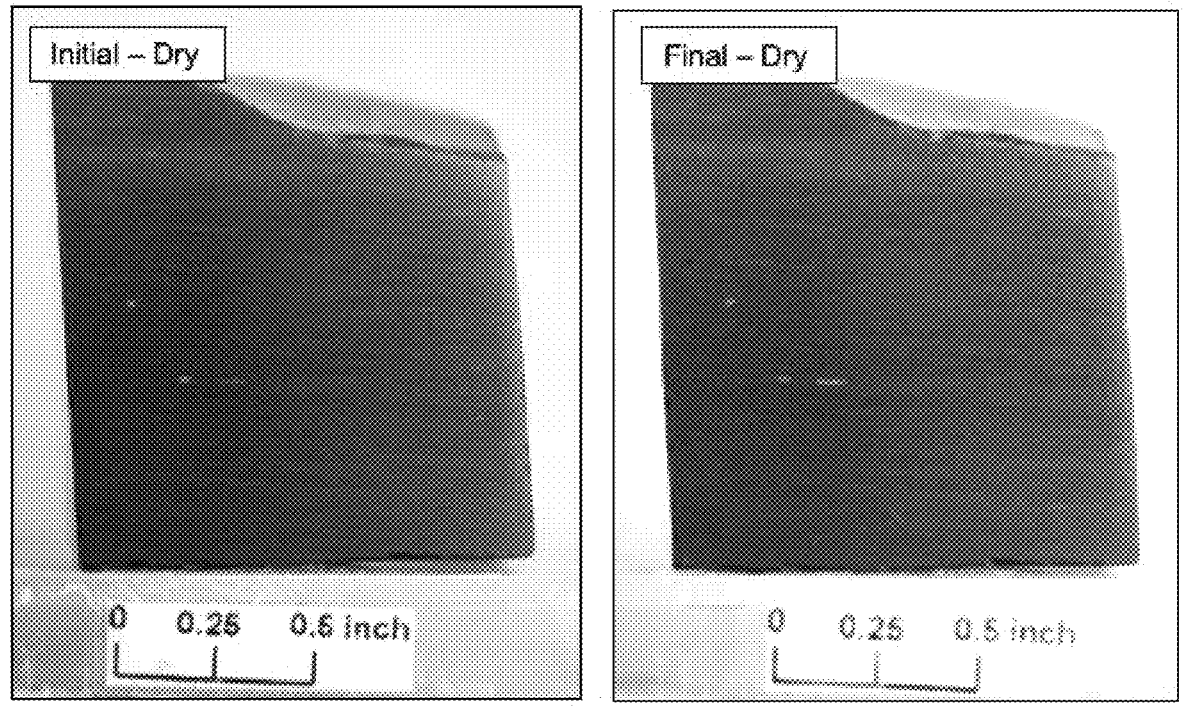
FIG. 13 is digital photographs of the thin section cut of the first core sample initially dry in the left-side photograph and finally dry after long-term exposure to the present divalent wellbore fluid comprising produced/formation water in the right-side photograph in accordance with embodiments disclosed herein.

FIG. 13 shows, prior to fluid exposure to the present divalent wellbore fluid comprising the produced/formation water, some pre-existing fracture planes were visible approximately parallel to the bedding laminations. After two (2) weeks of fluid exposure the present divalent wellbore fluid comprising the produced/formation water, pre-existing fractures were not enlarged or propagated. Development of new fractures was not evident.

Figure 14:
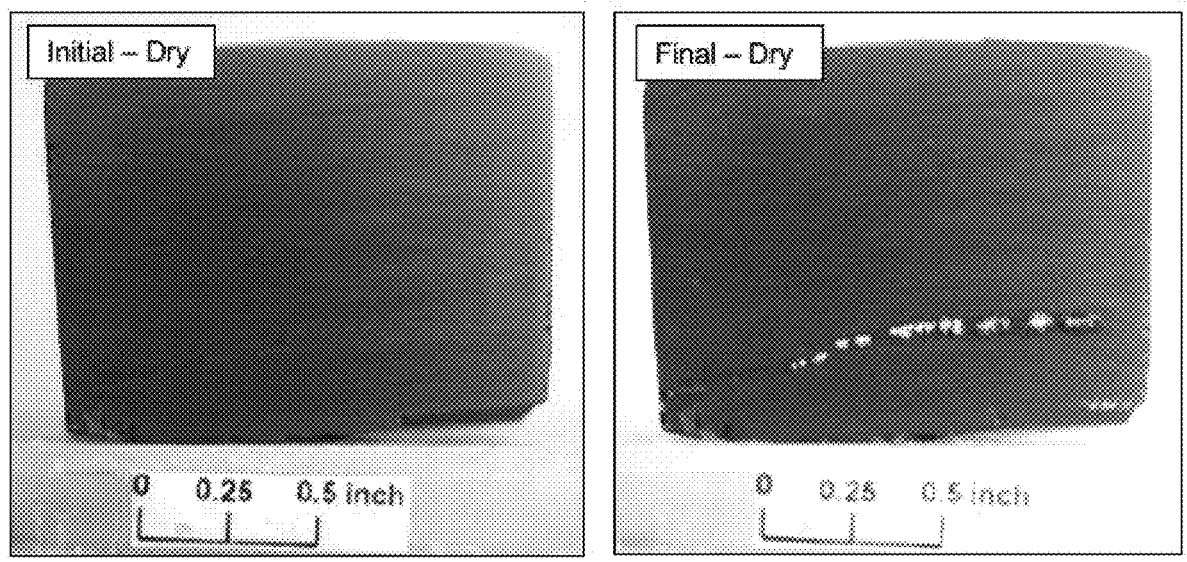
FIG. 14 is digital photographs of the thin section cut of the first core sample initially dry in the left-side photograph and finally dry after long-term exposure to the present divalent wellbore fluid comprising produced/formation water in the right-side photograph in accordance with embodiments disclosed herein.
Figure 15:
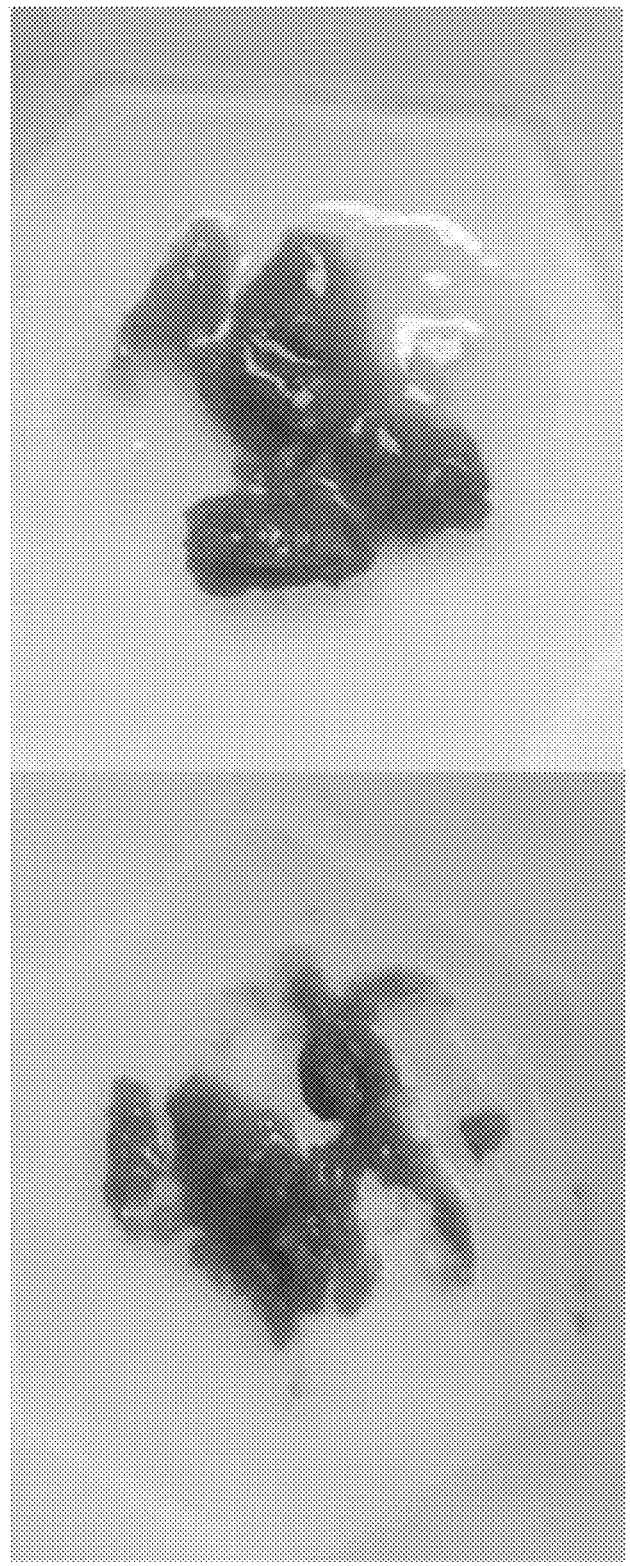
FIG. 15 is a digital photograph of the present divalent wellbore fluid after being hot rolled with at least one lubricant in accordance with embodiments disclosed herein.

FIG. 14 shows, prior to fluid exposure to the present divalent wellbore fluid comprising the produced/formation water, some pre-existing fracture planes were visible approximately parallel to the bedding laminations. After two (2) weeks of fluid exposure, pre-existing fractures were not enlarged or propagated. Development of new fractures was not evident. Minor precipitation was formed along pre-existing fracture surfaces after samples were removed from the fluids and allowed to dry at room temperature.

iv. Immersion Test Results:

The immersion test results showed development and/or propagation of fractures in hard and fissile shale core samples of Core Slabs 1 and 2, when the core samples were exposed to the three test fluids. Photographic documentation of the changes in the rock samples of Core Slabs 1 and 2 in FIGS. 9-14 for comparative evaluation of the effects of the three test fluids.

TABLE 4

Results of Long-Exposure Immersion Testing

| Fluid | Observations | Overall Stability |
|---|---|---|
| Freshwater | No major change visible. Precipitation along fracture planes after drying. Rock remained intact and stable. | High |
| Produced/Formation Water | No major change visible. Precipitation along fracture planes after drying. Rock remained intact and stable. | High |
| DIPRO (w/Produced/Formation Water) | No major change visible. Precipitation along fracture planes after drying. Rock remained intact and stable. | High |

Overall, the stability of the Core Slabs 1 and 2 is high in all three testing fluids. No major change was observed (see Table 4). Some precipitation after fluid testing and during the drying process was observed.

The Core Slabs 1 and 2 had low potential for chemical interaction and instability after being exposed to the three testing fluids. However, because of the high volume of pre-existing fractures, minimizing invasion and movement of the drilling fluid along fracture planes may be critical in order to maintain wellbore stability. No wettability measurement was available for the Core Slabs 1 and 2, but features (such as high organic matter, oily surface) may suggest that the core is likely oil-wet. If it is oil-wet, the use of oil-based drilling fluids could have more potential to invade and lubricate the fracture surfaces causing wellbore instability because of the low capillary entrance pressure. The use of the present divalent wellbore fluid, comprising the produced/formation water or brine base fluid, reduces or lessen the potential of the fluid invasion along pre-existing fracture planes because of the higher capillary entrance pressure.

v. Analysis of Produce/Formation Water

Atomic absorption analysis and Ion analysis-IC were utilized to examine and determine the composition of the produced/formation water testing fluids. The composition of produced/formation water testing fluids is set forth below in Table 5.

TABLE 5

Produced/formation water composition

| | -01 Formation Brine | -02 Formation Brine |
|---|---|---|
| Chloride | 15.9 w/w % | 15.1 w/w % |
| Bromide | ND | ND |
| Sodium | 9.15 w/w % | 8.96 w/w % |
| Potassium | 8.264 mg/kg | 5.678 mg/kg |
| Calcium | ND | ND |
| Magnesiu | 1.167 mg/kg | 1.163 mg/kg |
| Zinc | 64 mg/kg | 47 mg/kg |
| Iron | 52 mg/kg | 42 mg/kg | vi. Present Divalent Wellbore Fluid Composition, Formulation and Rheology

The present divalent wellbore fluid was formulated with the produced/formation water as a point of reference as set forth below Table 6, the rheology of the formulated divalent wellbore fluid is set forth in Table 7 and the tests involved with the rheology were the XRD test, the CEC test, the TGA test and the Immersion test.

TABLE 6

Present divalent wellbore fluid formulation
Formulation

| Product | Concentration |
|---|---|
| Produced/Formation Water | 350 mL |
| Di-Trol | 8 ppb |
| Di-Balance | 1.5 ppb |
| PTS-200 | 4 ppb |

TABLE 7

Present divalent wellbore fluid rheology
Rheology

| RPM | Before Hot-Rolling @ 235 F. | After Hot-Rolling @ 235 F. |
|---|---|---|
| 600 | 38 | 37 |
| 300 | 30 | 27 |
| 200 | 26 | 23 |
| 100 | 21 | 18 |
| 6 | 10 | 9 |
| 3 | 8 | 8 |

3. Divalent Wellbore Fluid with Field Brine Formulations and Properties

A plurality of the present divalent wellbore fluids, namely, Examples 1-14, comprising a field brine as the aqueous base fluid were formulated as set forth below Tables 8-11. As shown in upper portions of Tables 8-11, the Examples 1-14 comprise one or more components selected from the base fluid, the at least one primary viscosifier, the at least one secondary viscosifier, the at least one stabilizer and/or the at least one lubricant disclosed herein. The concentrations of the components are also set forth in the upper portions of Tables 8-11. Moreover, characteristics or properties of formulations in Examples 1-14 are set forth in bottom portions of Tables 8-11 and identified as "Mud Properties" therein.

TABLE 8

Formulations and properties of Examples 1-4.

| | 1 | | 2 | | 3 | | 4 | |
|---|---|---|---|---|---|---|---|---|
| Formulation | | | | | | | | |
| Field Brine, bbl | 1.0 | | 0.99 | | 0.99 | | 0.99 | |
| Di-Trol. ppb | | | 8.0 | | 8.0 | | 8.0 | |
| Di-Balance, ppb | | | 1.0 | | 1.0 | | 1.0 | |
| PTS-200, ppb | | | | | 4.0 | | 4.0 | |
| Torq Free HD, % | 3.0 | | | | | | 3.0 | |
| Mud Properties | Initial | Aged | Initial | Aged | Initial | Aged | Initial | Aged |
| Heat Aging Temp, ° F. | | 150 | | | | 150 | | |
| Heat Aging Hours | | 16 | | | | 16 | | |
| Static/Rolling | | R | | | | R | | |
| Rheology Temp, ° F. | | | 120 | | 120 | 120 | | |
| 600 rpm | | | 15 | | 35 | 30 | | |
| 300 rmp | | | 10 | | 27 | 20 | | |
| 200 rpm | | | 8 | | 23 | 16 | | |
| 100 rom | | | 5 | | 18 | 12 | | |
| 6 rpm | | | 1 | | 10 | 6 | | |
| 3 rpm | | | 1 | | 9 | 5 | | |
| PV, cps | | | 5 | | 8 | 10 | | |
| YP, lbs/100 ft$^2$ | | | 5 | | 19 | 10 | | |
| 10 Seconds Gel | | | 1 | | 9 | 5 | | |
| 10 Minutes Gel | | | 1 | | 11 | 7 | | |
| API Filtrate, mL | | | | | | | | 14.0 |
| Coefficient of Friction, μ 60 rpm & 150 psi | 0.03 | 0.05 | | | 0.11 | 0.13 | 0.03 | 0.03 |

TABLE 9

Formulations and properties of Examples 5-8.

| | *5 | | 6 | | 7 | | 8 | |
|---|---|---|---|---|---|---|---|---|
| Formulation | | | | | | | | |
| Field Brine, bbl | 0.99 | | 0.99 | | 0.99 | | 0.99 | |
| Di-Trol. ppb | 9.0 | | 9.0 | | 9.0 | | 9.0 | |
| Di-Balance, ppb | 2.0 | | 2.0 | | 2.0 | | 2.0 | |
| PTS-200, ppb | | | | | 4.0 | | 4.0 | |
| Torq Free HD, % | | | 3.0 | | | | 3.0 | |
| Mud Properties | Initial | Aged | Initial | Aged | Initial | Aged | Initial | Aged |
| Heat Aging Temp, ° F. | | 150 | | 150 | | 150 | | |
| Heat Aging Hours | | 16 | | 16 | | 16 | | |
| Static/Rolling | | R | | R | | R | | |
| Rheology Temp, ° F. | 120 | 120 | | | 120 | 120 | | |
| 600 rpm | 48 | 66 | | | 67 | 52 | | |
| 300 rpm | 36 | 45 | | | 53 | 39 | | |
| 200 rpm | 30 | 36 | | | 49 | 34 | | |
| 100 rpm | 23 | 26 | | | 41 | 17 | | |
| 6 rpm | 10 | 12 | | | 21 | 14 | | |
| 3 rpm | 9 | 10 | | | 19 | 13 | | |
| PV, cps | 12 | 21 | | | 14 | 13 | | |
| YP, lbs/100 ft$^2$ | 24 | 24 | | | 39 | 26 | | |
| 10 Seconds Gel | 10 | 10 | | | 19 | 13 | | |
| 10 Minutes Gel | 13 | 13 | | | 21 | 15 | | |
| API Filtrate, mL | | | 12.0 | | | | | >20.0 |
| Coefficient of Friction, μ @ 60 rpm & 150 psi | 0.11 | 0.13 | 0.03 | 0.03 | 0.13 | 0.14 | 0.03 | 0.03 |

TABLE 10

Formulations and properties of Examples 9 and 10.

|  | 9 | | 10 | |
|---|---|---|---|---|
| Formulation | | | | |
| Field Brine, bbl | 0.99 | | 0.99 | |
| Di-Trol. ppb | 8.0 | | 8.0 | |
| Di-Balance, ppb | 2.0 | | 2.0 | |
| PTS-200, ppb | | | 4.0 | |
| Mud Properties | Initial | Aged | Initial | Aged |
| Heat Aging Temp, °F. | | 150 | | 150 |
| Heat Aging Hours | | 16 | | 16 |
| Static/Rolling | | R | | R |
| Rheology Temp, °F. | 120 | 120 | 120 | 120 |
| 600 rpm | 53 | 46 | 57 | 41 |
| 300 rpm | 38 | 30 | 41 | 27 |
| 200 rpm | 31 | 24 | 35 | 21 |
| 100 rpm | 25 | 18 | 28 | 16 |
| 6 rpm | 12 | 8 | 17 | 9 |
| 3 rpm | 11 | 7 | 16 | 8 |
| PV, cps | 15 | 16 | 16 | 14 |
| YP, lbs/100 ft² | 23 | 14 | 25 | 13 |
| 10 Seconds Gel | 11 | 7 | 16 | 8 |
| 10 Minutes Gel | 15 | 10 | 19 | 10 |
| API Filtrate, mL | | 19.0 | | >30.0 |

TABLE 11

Formulations and properties of Examples 11-14.

|  | 11 | 12 | **13 | 14 | |
|---|---|---|---|---|---|
| Formulation | | | | | |
| Field Brine, bbl | 0.99 | 0.99 | 0.99 | 0.99 | |
| Di-Trol. ppb | 8.0 | 8.0 | 8.0 | 8.0 | |
| Di-Balance, ppb | 1.5 | 1.5 | 1.5 | 1.5 | |
| PTS-200, ppb | | 2.0 | 4.0 | | |
| ***Safe Lube, % | | | | 0.6 | |
| Mud Properties | Initial | Initial | Initial | Initial | Aged |
| Heat Aging Temp, °F. | | | | | 150 |
| Heat Aging Hours | | | | | 16 |
| Static/Rolling | | | | | R |
| Rheology Temp, °F. | 120 | 120 | 120 | 120 | 120 |
| 600 rpm | 23 | 45 | 41 | 29 | 34 |
| 300 rpm | 16 | 34 | 31 | 21 | 23 |
| 200 rpm | 13 | 29 | 27 | 18 | 19 |
| 100 rpm | 9 | 24 | 22 | 14 | 14 |
| 6 rpm | 3 | 13 | 11 | 7 | 7 |
| 3 rpm | 2 | 12 | 10 | 6 | 6 |
| PV, cps | 7 | 11 | 10 | 8 | 11 |
| YP, lbs/100 ft² | 9 | 23 | 21 | 13 | 12 |
| 10 Seconds Gel | 3 | 12 | 10 | 6 | 6 |
| 10 Minutes Gel | 4 | 15 | 12 | 9 | 8 |
| Coefficient of Friction, μ @ 60 rpm & 150 psi | | | | 0.07 | 0.12 |

The following remarks are associated with Tables 8-11 and/or Examples 1-14:
Field Brine Results (MW: 9.8 ppg, pH: 6.8, Total Hardness: 18,920 mg/L, Chlorides: 165,000 mg/L, Ca²⁺: 2,880 mg/L, Iron in brine: <10 mg/L, Coefficient of Friction @ 60 rpm & 150 psi: 0.09 μ);
* This sample was sheared 25 min longer, which is most likely why rheology numbers are higher. (original sample was 8 ppb DI-TROL and 1 ppb DI-BALANCE-then added 1 ppb of each), all samples containing TORQUE FREE HD exhibited greasy appearance;
** Sample 13 was previously sample 12 (which already contained 2 ppb) so an additional 2 ppb of PTS-200 was added to make a total of 4 ppb; and
***Coefficient of friction @ 60 rpm, & 150 psi for Field Brine and 0.6% Safe lube=0.05 μ.

4. Divalent Wellbore Fluid with Produced Brine Formulations and their Properties This example studied a plurality of the present divalent wellbore fluids, namely, Examples 15-24: each comprising a produced brine as the aqueous base fluid, mixed and/or formulated as set forth below in Table 12. As shown in upper portion of Table 12, the Examples 15-24 comprise one or more components selected from the base fluid, the at least one primary viscosifier, the at least one secondary viscosifier, and/or the at least one stabilizer disclosed herein. The concentrations of the components are also set forth in the upper portion of Table 12. Moreover, characteristics or properties of formulations in Examples 15-24 are set forth in bottom portion of Table 12 and identified as "Mixing Procedure" therein. Regarding the "Mixing Procedure", either a Hamilton Beach mixer (hereinafter "HB Mixer") or a Silverson Mixer (hereinafter "Silverson") was utilized for Examples 15-24. Moreover, the temperature during the mixing of Examples 15-24 was either room temperature (hereinafter "Room Temp") or 120° F. (hereinafter "120°").

TABLE 12

Formulations and properties of Examples 15-24.
Divalent Wellbore Fluids Comprising Produced Brine Base Fluids

|  | 15 | 16 | 17 | 18 | 19 | 20 | 21 | 22 | 23 | 24 |
|---|---|---|---|---|---|---|---|---|---|---|
| Brine Density | 9.76 ppg | 9.76 ppg | 9.76 ppg | 9.76 ppg | 9.76 ppg | 9.76 ppg | 9.76 ppg | 9.76 ppg | 9.76 ppg | 9.76 ppg |
| DI-TROL | 8 | 8 | 8 | 8 | 8 | 8 | 8 | 8 | 8 | 8 |
| DI-BALANCE | 1.5 | 1.5 | 2 | 2 | 1.5 | 1.5 | 2 | 2 | 3 | 3 |
| PTS-200 | 0 | 0 | 0 | 0 | 4 | 4 | 4 | 4 | 4 | 4 |
| Mixing Procedure | Room Temp HB Mixer | 120° Silverson | Room Temp HB Mixer | 120° Silverson | Room Temp HB Mixer | 120° Silverson | Room Temp HB Mixer | 120° Silverson | Room Temp HB Mixer | 120° Silverson |
| 600 | 14 | 15 | 17 | 20 | 15 | 22 | 21 | 26 | 17 | 37 |
| 300 | 8.5 | 10 | 12 | 14 | 9.5 | 16 | 14 | 19 | 11 | 30 |
| 200 | 7 | 8 | 9 | 11 | 8 | 12 | 12 | 13 | 9 | 26 |
| 100 | 5 | 6 | 7 | 9 | 6 | 10 | 10 | 11 | 6.5 | 24 |
| 6 | 2 | 3 | 3 | 4 | 3 | 5 | 4 | 5 | 3 | 12 |
| 3 | 1 | 2 | 2 | 3 | 2 | 4 | 3 | 4 | 2 | 11 |

TABLE 12-continued

Formulations and properties of Examples 15-24.
Divalent Wellbore Fluids Comprising Produced Brine Base Fluids

|    | 15  | 16 | 17 | 18 | 19  | 20 | 21 | 22 | 23 | 24 |
|----|-----|----|----|----|-----|----|----|----|----|-----|
| PV | 5.5 | 5  | 5  | 6  | 5.5 | 6  | 7  | 7  | 6  | 7  |
| YP | 3   | 5  | 7  | 8  | 4   | 10 | 7  | 12 | 5  | 23 |

5. Divalent Wellbore Fluid with Production Water Formulations and their

This example studied a plurality of the present divalent wellbore fluids, namely, Examples 15-24: each comprising a production water as the aqueous base fluid, mixed and/or formulated as set forth below in Table 12.

This example also studied different samples of production water for use as the aqueous base fluid of the divalent wellbore fluids in Examples 15-24.

The different samples of production water were submitted for ions analysis to determine compositions of each sample. The sample showing the highest salinity and highest hardness was subsequently used as the aqueous base fluid to design or formulate the divalent wellbore fluid as a reservoir drilling fluid or RDF. The highest salinity may be determined based on, for example, chloride concentration, and the hardness may be determined based on, for example, calcium ions concentration.

The ENDURADRIL RDF fluid system (hereinafter "ENDURADRIL system") was selected based on its ability to efficiently perform in presence of divalent ions. Three different viscosifier agents, namely, POWERVIS, FLOVIS PLUS and DI-TROL (as discussed above) were assessed. These different viscosifiers were selected in order to promote low pump pressure and very good hole cleaning at testing conditions.

FLO-VIS PLUS is a high yield, premium-grade, clarified xanthan gum. FLO-VIS PLUS is usable in RDFs and may produce elevated low-shear-rate viscosity (hereinafter "LSRV") and high, but fragile, gel strengths. These properties associated with FLO-VIS PLUS provide superior hole cleaning and suspension, improved hydraulics, reduced torque and drag, and assist in minimizing filtrate invasion. These properties may contribute to improved drilling performance, reduced formation damage and lower overall well costs.

POWER VIS is a branched linear polymer usable in low salinity brines, such as, for example, KCl and NaCl brines. POWER VIS may provide excellent low end rheology with reduced overall pump pressures. As a result, POWER VIS may be an available option for coiled tubing applications.

The design and evaluation of the formulated ENDURADRIL systems was performed by assessing the rheological properties, coefficient of frictions and visual observations. The bottom hole temperature at 265° F. and sixteen (16) hours dynamic aged were parameters desired. This example highlights the laboratory assessments undertaken in evaluating the ENDURADRIL systems and summarizes the results of said evaluation. The formulations of this example comprised 9.8 lb/gal of the ENDURADRIL system and were differentiated by the concentrations and the types of the viscosifiers (i.e., DI-TROL, FLO-VIS PLUS and POWER VIS) included therein.

A. Water Composition

Production water samples were submitted for ion analysis to determine the composition of each sample. Atomic Absorption Spectroscopy, Titration, Ion Chromatography analysis and ICPMS were methods used in said analysis. Results were used to mix synthetic production water utilized to build or formulate the ENDURADRIL systems. The water sample (hereinafter "WS") listed as WS1 was selected as base fluid based on higher calcium concentration ions present in its composition. The synthetic version of WS1 was used during the design process of the ENDURADRIL systems. The final ENDURADRIL system formulation obtained with synthetic version of WS1 was then re-evaluated using others production water samples to mitigate any issues. Table 13 shows composition and properties of the production WSs utilized in this example.

TABLE 13

Composition and Properties of the Production Water

| Ion       | WS1    | WS2    | WS3    | WS4    | WS5   | WS6    |
|-----------|--------|--------|--------|--------|-------|--------|
| Calcium   | 17400  | 12500  | 10100  | 15000  | 12000 | 16000  |
| Magnesium | 1200   | 1100   | 630    | 210    | 200   | 180    |
| Sodium    | 105500 | 95800  | 97200  | 67600  | 48400 | 108600 |
| Potassium | 8700   | 4400   | 4400   | 4980   | 4450  | 10000  |
| Strontium | 1700   | 870    | 650    |        |       |        |
| Barium    | 0.79   | 3.7    | 0.1    |        |       |        |
| Iron      | 0.1    | 0.1    | 0.1    | 104    | 1.5   |        |
| Aluminum  | 0.1    | 0.1    | 0.1    |        |       |        |
| Manganese | 24     | 6.8    | 1.7    |        |       |        |
| Chlorides | 190000 | 162000 | 155000 | 135000 | 99000 | 201000 |
| Bromide   | 910    | 530    | 420    | 500    | 410   | 1060   |
| Sulfate   | 180    | 550    | 950    | 520    | 470   | 200    |
| Nitrate   | 380    | 220    | 120    |        |       |        |
| Density   | 10.13  | 9.86   | 9.78   | 9.58   | 9.29  | 10.1   |
| pH        | 6.3    | 6.4    | 6.8    | 6.7    | 6.6   | 5.5    |

WS6 is a synthetic production water sample.

B. Laboratory Results of ENDURADRIL System i. Viscosifier Agent: FLOVIS Plus

The sample (i.e., WS1) with highest salinity and hardness was used to mix with different additives (i.e., POWER VIS, FLO-VIS PLUS and viscosifiers). Formulations of the ENDURADRIL systems with FLO-VIS PLUS and POWER VIS are set forth below in Table 14.

TABLE 14

Formulation of ENDURADRIL System with FLOVIS PLUS and POWER VIS.

| PRODUCT      | UNITS | 1   | 2    |
|--------------|-------|-----|------|
| POWER VIS    |       |     | 1    |
| FLO-VIS PLUS | ppb   | 1.5 |      |
| Caustic Soda | ppb   | 1.2 |      |
| Soda Ash     | ppb   | 0.5 | 0.75 |

Figure 16:
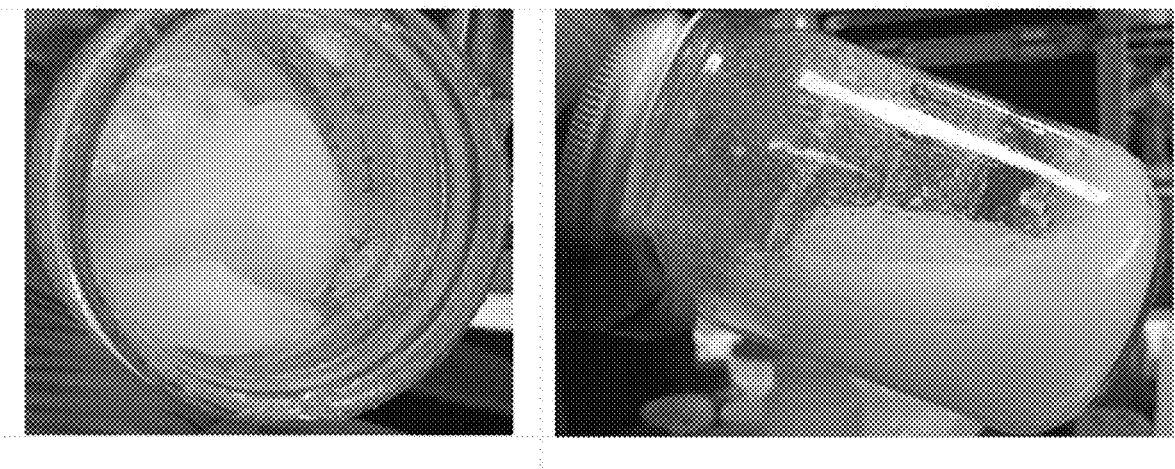
FIG. 16 is digital photographs showing top and side views, respectively, of a production water mixed with a viscosifier.

The blend with POWER VIS did not yield. To mix with FLO-VIS PLUS was used Caustic Soda and Soda Ash to increase pH and treated hardness. This blend with FLO-VIS PLUS was cross-linked and FIG. 16 shows sample with FLO-VIS PLUS. The products yield in that water sample very well. Moreover, FIG. 16 is digital images showing top and side views of production water WS1 mixed with 1.5 lb/bbl FLO-VIS PLUS.

ii. Viscosifier Agent: DITROL

Several formulations of ENDURADRIL system at 9.8 lb/gal densities were mixed using M-I SWACO water-based mud work instruction procedures. Table 15 shows chemicals used to formulate ENDURADRIL systems and their functions.

TABLE 15

Functions of Chemicals used to build ENDURADRIL Systems

| Products | Function |
|---|---|
| DI-TROL | Viscosity/FLC |
| DI-BALANCE | Buffer/Viscosity |
| PTS-200 | Thermal Stabilizer |
| SAFE-LUBE | Lubricant |

Hamilton Beach, HB, mixers settled at approximately 3800 rpm were utilized to mix each RDF samples. At the end of the mixing, the pH values were measured with a pH-Meter. Viscosity properties after mixing and after aging (rolled) after 16 hours at 265° F. were measured with a FANN-35 viscometer and were measure coefficient of friction with a Lubricity meter.

Twenty-four (24) formulations of ENDURADRIL were mixed and properties recorded. The three first formulations in Table 16 (Products 7, 9 and 10) were differentiated by addition of PTS-200 and a SAFE-LUBE.

TABLE 16

ENDURADRIL Formulations and Properties (Products 7, 9 and 10)

| Product | 7 (SW*) | | 9 (SW*) | | 10 (SW*) | |
|---|---|---|---|---|---|---|
| DI-TROL | 10 | | 10 | | 10 | |
| DI-BALANCE | 2 | | 2 | | 2 | |
| PTS-200 | 4 | | | | 4 | |
| SAFE-LUBE | 2% | | | | | |
| Properties | 7 | | 9 | | 10 | |
| | BHR | AHR | BHR | AHR | BHR | AHR |
| 600 RPM | 31 | 48 | 23 | 34 | 44 | 53 |
| 300 RPM | 22 | 32 | 13 | 22 | 32 | 36 |
| 200 RPM | 18 | 26 | 10 | 17 | 27 | 29 |
| 100 RPM | 14 | 18 | 6 | 12 | 20 | 21 |
| 6 RPM | 7 | 8 | 3 | 3 | 10 | 10 |
| 3 RPM | 5 | 7 | 2 | 2 | 9 | 9 |
| GELS 10" | 6 | 7 | 1 | 3 | 11 | 10 |
| GELS 10' | 7 | 7 | 2 | 3 | 16 | 12 |
| PV | 9 | 16 | 10 | 12 | 12 | 17 |
| YP | 13 | 16 | 3 | 10 | 20 | 19 |
| CoF | | 0.154 | | | | 0.171 |
| pH | | 8.64 | | 7.93 | | 9.29 |

SW* is the synthetic water

The PST-200 (i.e., thermal stabilizer) was used to prevent the degradation of polymers at temperature of 265° F. The SAFE LUBE, a lubricant, was used to promote lower coefficient of friction while drilling. The DI-TROL (i.e., viscosifier agent) synergistically acted with DI-BALANCE to provide low end rheology required for hole cleaning. The concentration of DI-TROL was decreased from 10 lb/bbl to 9 lb/bbl in order to reduce the viscosity of the ENDURADRIL system and complain with equivalent circulation density (hereinafter "ECD") calculated by Virtual Hydraulic Software. The ECD value should be below 12.5 lb.gal fracture gradient of the well. Table 17 captures five (5) formulations and properties of ENDURADRIL system mixed with 5 production water samples.

TABLE 17

ENDURADRIL Formulations and Properties (Products 20 to 24)

| Product | 20 WS3 | 21 WS1 | 22 WS2 | 23 WS5 | 24 WS4 |
|---|---|---|---|---|---|
| DI-TROL | 9 | 9 | 9 | 9 | 9 |
| DI-PTS-200 | 2 | 2 | 2 | 2 | 2 |
| | 4 | 4 | 4 | 4 | 4 |
| SAFE-LUBE | 2% | 2% | 2% | 2% | 2% |
| Properties | 20 | 21 | 22 | 23 | 24 |
| | AHR | AHR | AHR | AHR | AHR |
| 600 RPM | 25 | 49 | 29 | 18 | 26 |
| 300 RPM | 19 | 34 | 21 | 12 | 18 |
| 200 RPM | 16 | 27 | 17 | 10 | 15 |
| 100 RPM | 12 | 21 | 14 | 7 | 11 |
| 6 RPM | 7 | 12 | 7 | 4 | 6 |
| 3 RPM | 6 | 11 | 6 | 3 | 5 |
| GELS 10" | 7 | 11 | 7 | 3 | 6 |
| GELS 10' | 7 | 11 | 8 | 5 | 7 |
| PV | 6 | 15 | 8 | 6 | 8 |
| YP | 13 | 19 | 13 | 6 | 10 |
| CoF | 0.137 | 0.088 | 0.117 | 0.137 | 0.132 |
| pH | 8.69 | 8.45 | 8.71 | 8.97 | 8.95 | iii. Coefficient of Friction

Figure 17:
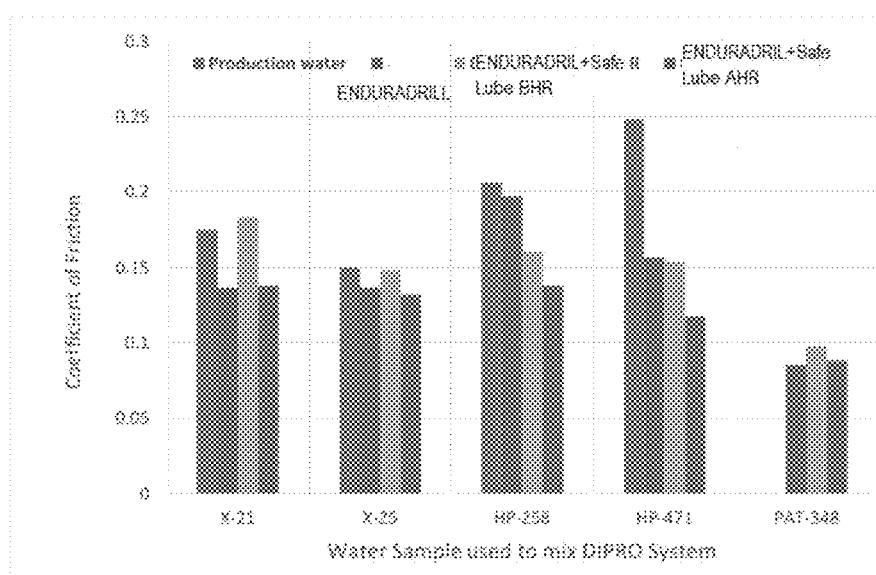
FIG. 17 is a graph of coefficient of friction values for wellbore fluids in accordance with embodiments disclosed herein.

The lubricity tester was used to measure coefficient of frictions (also referred to as "CoF" in Table 17) of the fluids. The results were reported as percentage of diminution or augmentation of CoF fresh water. FIG. 17 shows results collected. The WS3, WS4, WS5, WS2 and WS1 were reported on the horizontal axis are name of production water samples, WSs, used to mix ENDURADRIL system. The color code refers are:

blue column shows coefficient of friction of the sample of production water;

red column is the ENDURADRIL mixed with that water;

green column is ENDURADRIL with lubricant before hot rolling;

purple column is ENDURADRIL with lubricant after hot rolling.

The vertical axis reports values of CoF measured with Lubriciter Tester Model #. The CoF values of initial production water seemed to be in relation with concentration of divalent ions present into the system. The addition of DI-TROL (polymer) contributes to decrease the CoF value compared to the first measured with production water as shown by FIG. 17 (Blue and Red Column). But the addition of 2% v/v of SAFE-LUBE increased the CoF of three ENDURADRIL samples before hot rolling (Green Column of FIG. 17). Then the CoF values after dynamic aged decrease back to almost same values that before addition of SAFE-LUBE. Only with Products including WS5 and WS2 show significate improvement. Based on these results, it seems like some reactions occurred between and some production waters and SAFE-LUBE. The presumed reaction seems to annul properties of SAFE-LUBE.

D. Summary

Based on the experimental conditions and results achieved, one or more of the following conclusions and/or recommendations listed below may be made:

The blend with POWER VIS did not yield; the blend with FLO-VIS PLUS was cross-linked; and only ENDURADRIL products yield in water sample very well;

One recommended ENDURADRIL formulation using production water may be showed in Table 21.

After 16 hour hot-rolling, ENDURADRIL system has a Plastic Viscosity (PV) and Yield Point (YP) of 8 cP and 13 lb/100 ft$^2$ respectively. The reading at 6 rpm and 3 rpm are 7 and 6, respectively.

The coefficient of friction is lower in ENDURADRIL system (for sample WS2) than in production water. The CoF of that sample exhibited a reduction of 37% compared to production water WS2, and a reduction of 52.7% when SAFE-LUBE is added to ENDURADRIL after aging.

Results from Virtual Hydraulics with ENDURADRIL system showed better hole cleaning than the production water. In order to get hole cleaning index below 0.25 (very good hole cleaning) the value of ROP recommended is 25 ft/hr.

TABLE 21

| One recommended potential formulation | |
| --- | --- |
| DITROL | 9 ppb |
| DI-BALANCE | 2 ppb |
| PTS-200 | 4 ppb |
| SAFE-LUBE | 2% |

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A method of preparing a wellbore fluid comprises:
   providing an aqueous base fluid comprising an inhibitive divalent fluid, a primary viscosifier comprising a starch derivative, a secondary viscosifier comprising a magnesium compound, at least one stabilizer comprising a blend of polymeric alkaline materials, and a lubricant; and
   mixing the aqueous base fluid, the primary viscosifier, the secondary viscosifier, the at least one stabilizer, and the lubricant to form the wellbore fluid,
   wherein the wellbore fluid is a biopolymer-free fluid, and
   wherein the secondary viscosifier is present in the wellbore fluid at a concentration from about 0.5 kg/m$^3$ to about 7 kg/m$^3$.

2. The method of claim 1, further comprising:
   pumping the wellbore fluid into a wellbore;
   retrieving the wellbore fluid from the wellbore; and
   filtering the wellbore fluid for a subsequent use.

3. The method of claim 1, further comprising:
   wherein the at least one stabilizer comprises at least one cloud point polyglycol based shale stabilizer.

4. The method of claim 3 wherein the at least one cloud point polyglycol based shale stabilizer is selected based on an expected downhole temperature of a wellbore and a salinity level of the aqueous base fluid.

5. The method of claim 1 wherein the at least one stabilizer is designed to buffer a pH value of the wellbore fluid in a pH region of from about 9 to about 12.

6. The method of claim 1 wherein the aqueous fluid further comprises a salt selected from the group consisting of alkali metal chlorides, hydroxides, carboxylates, sodium, calcium, sulfur, aluminum, magnesium, potassium, strontium, silicon, lithium, and phosphorus salts of chlorides, bromides, carbonates, iodides, chlorates, bromates, formates, nitrates, oxides, and fluorides.

7. The method of claim 1 wherein the aqueous base fluid is a water-based fluid.

8. The method of claim 1 wherein the aqueous base fluid is a divalent brine base fluid.

9. The method of claim 8 wherein the divalent brine base fluid has a density from about 1.0 g/cm$^3$ to about 1.5 g/cm$^3$.

10. The method of claim 8 wherein the divalent brine base fluid has a density up to about 3.0 g/cm$^3$.

11. The method of claim 8 wherein the divalent brine base fluid is a produced brine base fluid.

12. The method of claim 11 wherein the produced brine base fluid comprises at least one heavy metal selected from the group consisting of As, Cd, Cr, Cu, Mn, Mo, Ni, Pb, Se, V, and Zn.

13. The method of claim 1 wherein the primary viscosifier has a concentration from about 20 kg/m$^3$ to about 40 kg/m$^3$.

14. The method of claim 1 wherein the lubricant is present in the wellbore fluid at a concentration of no more than 5%.

15. The method of claim 1 wherein the wellbore fluid is selected from the group consisting of a drilling fluid, a cementing fluid, a completion fluid, a packing fluid, a work-over (repairing) fluid, a stimulation fluid, a well killing fluid, a spacer fluid, and a drill-in fluid.

16. The method of claim 1 wherein the primary viscosifier is a branched-chain starch derivative.

17. The method of claim 1 wherein the lubricant is an alcohol or comprises at least one alkyl or at least one aryl in the form of an ester or ether.

18. The method of claim 1 wherein the wellbore fluid further comprises at least additive selected from the group consisting of a wetting agent, an organophilic clay, a fluid loss control agent, a surfactant, a dispersant, an interfacial tension reducer, a pH buffer, a mutual solvent, a thinner, a thinning agent, and a cleaning agent.

19. The method of claim 1 wherein the wellbore fluid has a plastic viscosity value of about 2.5 cP to about 30 cP.

20. The method of claim 1 wherein the wellbore fluid has a yield point value of about 2.5 lb/100 ft$^2$ to about 50 lb/100 ft$^2$.

* * * * *